Oct. 20, 1942.   L. P. CREASY   2,299,382
AUTOMOBILE TENT
Filed March 14, 1941   2 Sheets-Sheet 1
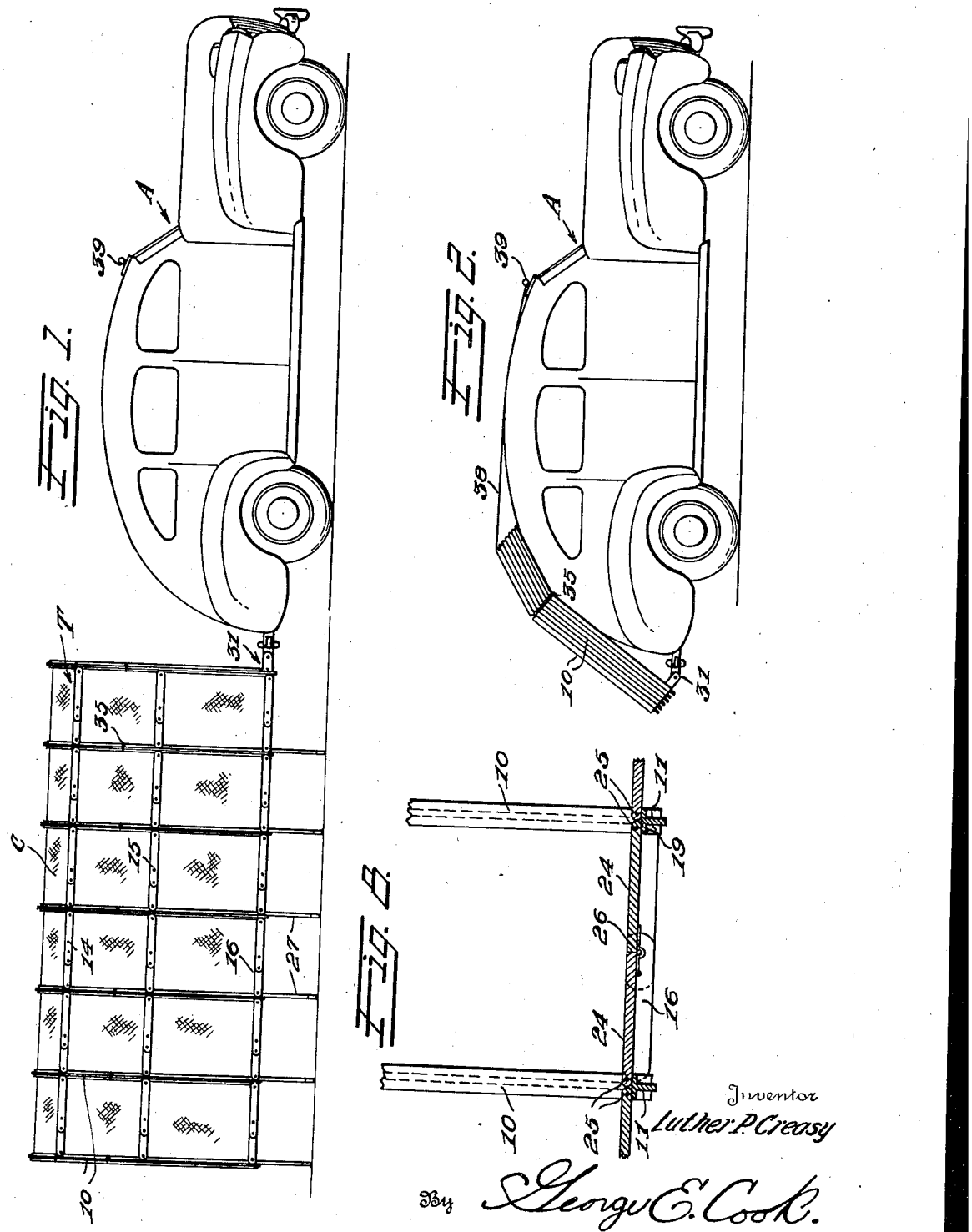

Oct. 20, 1942. L. P. CREASY 2,299,382
AUTOMOBILE TENT
Filed March 14, 1941 2 Sheets-Sheet 2
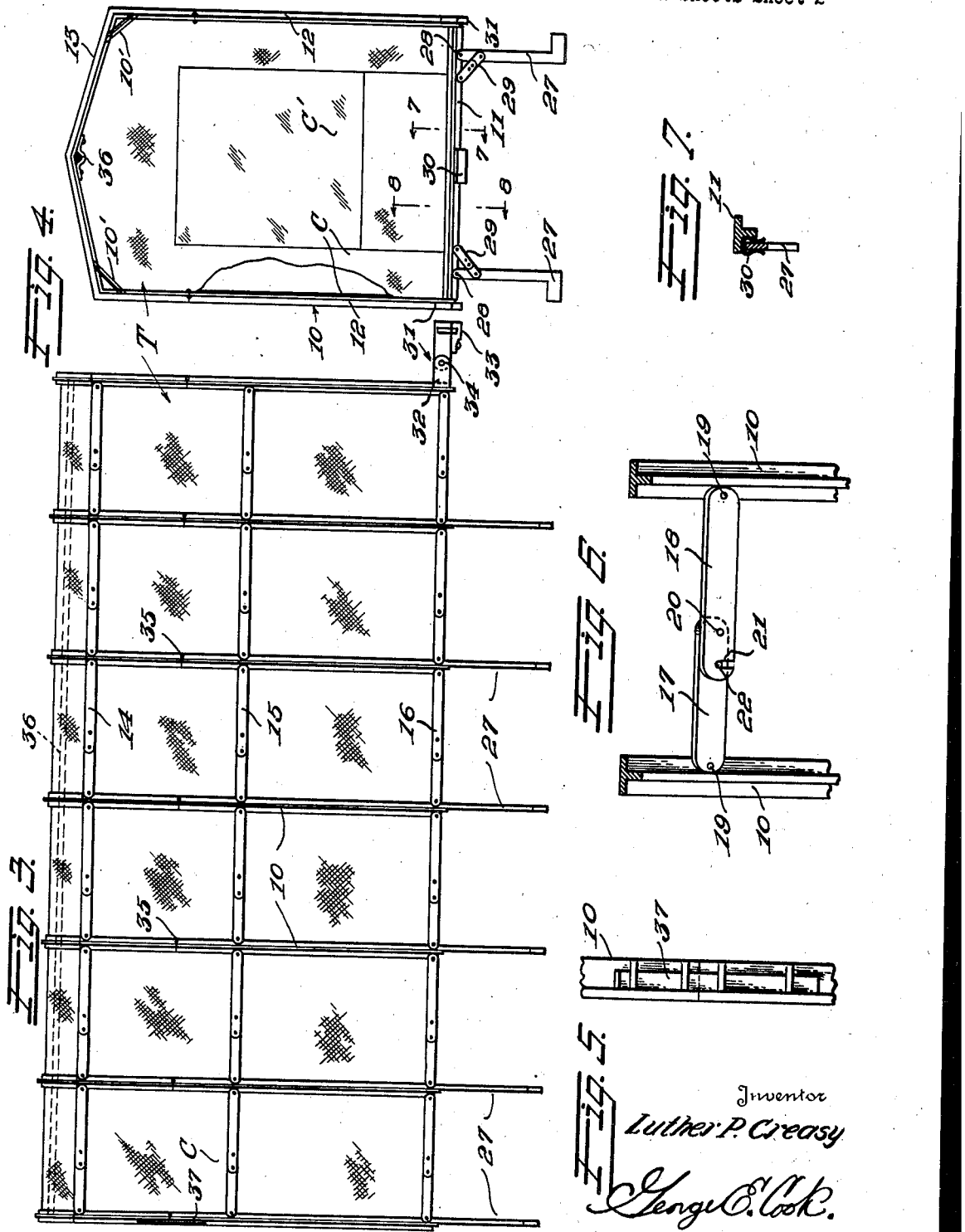
Inventor
Luther P. Creasy
George E. Cook.
Attorney Patented Oct. 20, 1942

2,299,382

UNITED STATES PATENT OFFICE 2,299,382

AUTOMOBILE TENT

Luther P. Creasy, Catawissa, Pa.

Application March 14, 1941, Serial No. 383,424

9 Claims. (Cl. 135—1)

This invention relates to an auto tent.

The invention is more particularly concerned with a tent embodying a collapsible framework covered with canvas, Cellophane, or the like, whereby the tent when set up is more of the nature of a trailer body and embodies substantially all the comforts thereof.

The convenience and comfort of the modern day trailer over canvas tents heretofore carried on touring or camping trips is well appreciated. However, the trailer presents some objections, paramount of which is the necessity of pulling same by the automobile. While the modern trailer is comparatively light and requires relatively little power to pull it, nevertheless its use presents objections from the standpoint of its swaying action at high speed which not only strains the chassis of the auto, but also presents more or less danger when passing other autos or upon negotiating sharp curves.

The trailer is much preferred over the common form of tent due to its greater stability, greater comfort and to its greater weather insulating properties.

The tent according to this invention, however, provides substantially all of the desirable features of the trailer, while at the same time eliminates the objectionable necessity of pulling it on wheels as is the case with the trailers.

A primary object of this invention, accordingly, is the provision of a collapsible frame tent constructed for ready attachment to the body of an automobile for transportation of same and which is capable of being readily set up more or less in the form of the modern trailer body and presenting substantially all the conveniences and comforts thereof.

A further object of the invention is an auto tent of the above-noted character which is light in weight, neat in appearance, and which is capable of manufacture at relatively low cost.

For a more complete understanding of the nature and objects of the invention, reference will be had to the following detailed description, taken in connection with the accompanying drawings, wherein—

Fig. 1 is a side elevational view of an automobile, showing the use of the improved tent in association therewith;

Fig. 2 is a view similar to Fig. 1, but showing the tent collapsed and secured to the automobile for transportation;

Fig. 3 is a side elevational view of the tent on an enlarged scale;

Fig. 4 is a right hand end view of the tent illustrated in Fig. 3;

Fig. 5 is an enlarged fragmentary elevation as observed from the left end of Fig. 3;

Fig. 6 is an enlarged fragmental elevation showing more clearly the collapsible connection of the tent frame members;

Fig. 7 is a transverse section in a plane as represented by the line 7—7 in Fig. 4; and Fig. 8 is a fragmental vertical section in a plane substantially as represented by the line 8—8 in Fig. 4 and more particularly illustrating the collapsible formation of the tent floor.

Referring now in detail to the drawings by reference characters, and wherein like characters designate like parts in the different views, T designates the tent in its entirety and which is adapted for removable pivotal connection with an automobile A in a manner later described.

The improved tent T comprises a plurality of substantially rectangular frame members 10 preferably formed from T-bar stock and preferably of relatively light gauge. The material of these frame members as well as the metallic connecting members later referred to is preferably aluminum which not only has the desirable quality of lightness but also is substantially rustproof.

Each of the frame members 10 includes a horizontal base section 11, laterally opposed vertical sections 12 and an angular top or roof section 13. Suitable braces 10' may be provided at the junction of sections 12 and 13 as is indicated in Fig. 4.

These frame members 10 are maintained in uniform spaced relation by collapsible means later referred to and the stems of the T-bar stock are preferably disposed outwardly thereby providing smooth surfaces interiorly for connection of the covering C which may be of canvas or like material, or it may also be of Cellophane thereby not to obstruct rear visibility or visibility of the lights and tag when connected to the auto as in Fig. 2.

When the covering C is of opaque material, relatively large windows of transparent material C' may be provided in the opposite ends of the tent as indicated in Fig. 4.

The collapsible connecting means for the frame members 10 include a series of link members 14 adjacent the top of the frame member, a like series of link members 15 midway of the height of the frame members and a similar series of link members 16 adjacent the base sections 11 of the frame members.

These link members are of common and well-known form, working on a toggle principle and each includes links 17 and 18 (Fig. 6) pivotally connected at their opposed ends at 19 to adjacent frame members 10.

The links 17 and 18 are pivotally connected together adjacent their inner ends as at 20 and link 18 is provided with an edge slot 21 removably receiving a pin 22 on link 17.

It will accordingly be seen that upon lateral pressure to the line members 14, 15, and 16 the frame members 10 can be moved into contact as illustrated in Fig. 2.

The tent is also provided with a floor which may conveniently include a pair of panels 24 between each two adjacent frame members 10 (Fig. 8).

The panels 24 are pivotally connected with the frame members immediately above the base sections 11 as indicated at 25 and the adjacent edges of the panels are pivotally connected with transverse pivot rods 26 forming the pivotal connections of the link members 16.

Due to the slight offset relation of pivots 19 and 25, the latter may be slightly loose to permit upward folding of the panels 24 within the opposite face margins of the frame members 10.

The improved tent is further provided with collapsible legs 27 which as more clearly indicated in Fig. 4 are pivotally connected at their upper ends with the base frame sections 11 as at 28 and the legs are maintained in upright position by means of the link member 29 which are similar in construction and operation to the link members 14, 15, and 16.

The base sections 11 are preferably provided with spring keepers 30 for frictionally engaging the legs and maintaining them in collapsed position as indicated in Fig. 7.

The front end frame member 10 is provided with suitable clamp members 31 for connection with the rear bumper of the automobile A.

These clamps preferably comprise sections 32 rigid with the frame member and bumper engaging sections 33 pivotally connected to the sections 32 as indicated at 34.

The clamp connections thus provide for the entire tent when collapsed to be pivoted into engagement with the rear and roof section of the automobile as indicated in Fig. 2. Furthermore, the tent may be maintained in connection with the bumper when assembled as in Fig. 1.

In order that the relative high frame members 10 may more nearly conform with the curved auto top when collapsed they may conveniently be pivoted adjacent their upper ends as indicated at 35 for pivotal movement toward the front of the tent only. In order to maintain the pivoted side sections 12 in vertical alinement upon setting the tent up, the members 10 may all be connected by a flexible element, such as a cable or chain 36 and the rearmost side sections 12 may be provided with slidable latches in vertical alinement.

Since the covering, in the form of canvas or Cellophane or the like is relatively thin, the frame members can be folded into face to face contact since the interconnecting link members and floor panels will lie between the opposed faces of the frame members. The link members are, of course, shown of exaggerated width, in practice they will be of a width to lie within the frame members.

The tent is capable of being set up quickly and when so set up it will provide a neat and comfortable trailer-like living quarters. The tent may be provided with canvas partitions, foldable cots and the like without materially increasing the bulk thereof when collapsed as in Fig. 2.

When it is desired to collapse the tent and secure it for transportation, the link members 14, 15, and 16 together with the floor panels 24 are laterally deflected and the frame members pushed together, the legs are then swung upwardly into clamping engagement with the keepers 30, and then the latches 37 are released to allow flexing the upper part of the collapsed frame as indicated in Fig. 2.

The entire tent is then swung about the pivots 34 into contact with the auto body as indicated in Fig. 2. Suitable straps as indicated at 38 may have adjacent ends thereof connected with the rearmost frame member 10 and the other ends of such straps may be secured to a projection 39 on the automobile body, or such straps may be extended to the front bumpers or other securing parts.

With the improved tent thus collapsed and strapped to the automobile it can be conveniently transported, and by the use of Cellophane covering or large end windows the driver's rear view as well as the rear tag and lights will not be obstructed.

When it is desired to set the tent up, it can readily be accomplished with little effort as well as in a relatively short time, and when it is set up living quarters are provided which are substantially equal in comfort and convenience to the usual trailer body now in use.

While I have disclosed specific collapsible frame member connecting means, it is to be understood that other means are considered within the scope of this invention which in its broadest aspect comprises a framed tent which is readily collapsible for transportation on the back and roof of an automobile.

While but a single specific embodiment of my invention is herein disclosed, such is to be considered as illustrative only, and not restrictive, the scope of the invention being defined in the subjoined claims.

What I claim and desire to secure by U. S. Letters Patent is:

1. A collapsible auto tent comprising a plurality of parallel vertically disposed open frame members, a flexible covering secured to said frame members interiorly thereof, means for holding said frame members in uniform spaced relation with said covering taut while permitting collapsing of the frame members into side edge contact, foldable legs secured to the frame members, and a floor formed of pivotally connected panels capable of folding within the opposed side edges of the frame members when the latter are collapsed into side edge contact.

2. A collapsible auto tent comprising a plurality of parallel vertically disposed open frame members, a flexible covering secured to said frame members interiorly thereof, means for holding said frame members in uniform spaced relation with said covering taut while permitting collapsing of the frame members into side edge contact, foldable legs secured to the frame members, said frame members being formed in pivotally connected sections for substantial conformity of the frame members with the roof of an auto when the frame members are collapsed.

3. A collapsible auto tent comprising a plurality of parallel vertically disposed open frame members, a flexible covering secured to said frame members interiorly thereof, means for holding said frame members in uniform spaced relation with said covering taut while permitting collapsing of the frame members into side edge contact, foldable legs secured to the frame members, the frame member at one end of the tent provided with means for pivotal connection with the rear bumper of an auto, and the frame member at the opposite end of the tent provided with flexible means for tying the collapsed tent to the body of the auto.

4. An auto tent comprising a plurality of vertical frame members, links pivotally connecting the frame members intermediate the tops and bottoms thereof for maintaining the frame members in parallel spaced relation and permitting collapsing thereof into side edge contact, said frame members including upper and lower sections pivotally interconnected above said link connections for swinging movement of the upper sections toward the front of the tent, means for holding the upper sections in vertical alinement with the lower sections, and a flexible covering secured to the frame members.

5. An auto tent according to claim 4 together with collapsible link connections between the upper sections of said frame members.

6. An auto tent according to claim 4 wherein said means comprises a flexible element connected to all of the upper sections, and slidable latches cooperating with the upper and lower sections of the rearmost frame member.

7. A collapsible auto tent comprising a plurality of vertically disposed frame members, collapsible means interconnecting the frame members intermediate the tops and bottoms thereof, toggle links interconnecting the frame members at the bottoms thereof, a floor formed of a pair of panels between the frame members of each successive pair thereof, the opposed edges of the panels pivotally connected with the adjacent frame members, and the adjacent edges of the panels having pivotal connections with the toggle links.

8. A collapsible auto tent comprising a plurality of parallel vertically disposed open frame members, a flexible covering secured to said frame members interiorly thereof, means for holding said frame members in uniform spaced relation with said covering taut while permitting collapsing of the frame members into side edge contact, legs pivotally connected with the frame members for swinging movement transversely of the tent into contact with the bottoms of the frame members, means for holding the legs in tent sustaining position, and spring keepers on the bottoms of the frame members for retaining the legs in folded position against the bottoms of the frame members.

9. An auto tent comprising a plurality of vertical frame members, a covering secured to said frame members, means on one of said frame members for pivotal connection with a bumper of an automobile, means releasably holding said frame members in uniform spaced parallel relation while permitting same to be collapsed into substantial engagement, and said frame members comprising pivotally connected sections for substantial conformity of the collapsed frame members with the back and top of the automobile.

LUTHER P. CREASY.